United States Patent
Huang

(10) Patent No.: US 9,715,398 B2
(45) Date of Patent: Jul. 25, 2017

(54) PROGRAM CODE LOADING METHOD OF APPLICATION AND COMPUTING SYSTEM USING THE SAME

(71) Applicant: MStar Semiconductor, Inc., Hsinchu Hsien (TW)

(72) Inventor: Chien-Hsing Huang, New Taipei (TW)

(73) Assignee: MSTAR SEMICONUCTOR, INC., Hsinchu Hsien (TW)

( * ) Notice: Subject to any disclaimer, the term of this patent is extended or adjusted under 35 U.S.C. 154(b) by 227 days.

(21) Appl. No.: 14/840,443

(22) Filed: Aug. 31, 2015

(65) Prior Publication Data
US 2017/0031696 A1    Feb. 2, 2017

(30) Foreign Application Priority Data
Jul. 27, 2015  (TW) .............................. 104124270 A

(51) Int. Cl.
G06F 9/00       (2006.01)
G06F 15/177   (2006.01)
G06F 9/445    (2006.01)

(52) U.S. Cl.
CPC ................................ G06F 9/44578 (2013.01)

(58) Field of Classification Search
None
See application file for complete search history.

(56) References Cited

U.S. PATENT DOCUMENTS

2009/0013192 A1*  1/2009  Chen .................. G06F 11/1004
                                                                  713/189
2010/0064127 A1*  3/2010  Lee ..................... G06F 11/1417
                                                                    713/2

FOREIGN PATENT DOCUMENTS

CN           1302016        7/2001
CN      101556547 B    10/2009

* cited by examiner

Primary Examiner — Nitin Patel
(74) Attorney, Agent, or Firm — WPAT, PC

(57) ABSTRACT

A program code loading method of an application is applied to a computing system that stores a program code of an application in a flash memory. The program code is loaded in a recording mode, including generating an initial address and a data length of a second program code of the application by executing a first program code of the application. According to the initial address and data length, the second program code is loaded from the flash memory to a DRAM. A replay file, including the initial address and the data length of the second program code, is generated and stored to the flash memory. The program code is loaded in a replay mode, including loading the second program code from the flash memory to the DRAM according to the initial address and data length of the second program code in the replay file.

14 Claims, 6 Drawing Sheets

PROGRAM CODE LOADING METHOD OF APPLICATION AND COMPUTING SYSTEM USING THE SAME

This application claims the benefit of Taiwan application Serial No. 104124270, filed Jul. 27, 2015, the subject matter of which is incorporated herein by reference.

BACKGROUND OF THE INVENTION

Field of the Invention

The invention relates in general to a program code loading method of a computing system, and more particularly to a program code loading method of an application of a computing system.

Description of the Related Art

With the development of technologies, computing systems are extensive applied. In a boot procedure of a computing system, a processor usually sequentially loads and executes a bootloader and a system kernel, and loads and executes a specific application after completing the boot procedure. For example, the specific application is a framework application. In general, the data amount of an application is quite large, and so a program code of an application is loaded and executed in a section divided manner. In the section divided loading and execution process, the processor only learns which other section of the program code of the application is next to be loaded after completely executing one section of the program code. That is, the activation speed the application cannot be accelerated through pre-loading the program code to be executed.

SUMMARY OF THE INVENTION

The invention is directed to a program code loading method of an application and a computing system using the program code loading method. A loading sequence of the program code of the application is recorded in a recording mode, and the program code of the application is pre-loaded in a replay mode according to the program code loading sequence previously recorded, thereby accelerating the activation speed of the application.

According to an aspect of the present invention, a computing system is provided. The computing system includes a flash memory, a dynamic random access memory (DRAM) and a processor. The flash memory stores a program code of an application. In a recording mode, the processor loads the program code of the application, including generating an initial address and a data length of a second section of the program code by executing a first section of the program code of the application, loads the second section of the program code of the application from the flash memory to the DRAM according to the initial address and the data length of the second section of the program code, generates a replay file including the initial address and the data length of the second section of the program code, and stores the replay code to the flash memory. In a replay mode, the processor loads the program code of the application, including loading the second section of the program code of the application from the flash memory to the DRAM according to the initial address and the data length of the second section of the program code in the replay file.

According to another aspect of the present invention, a program code loading method of an application is provided. The program code loading method is applied to a computing system that stores a program code of an application in a flash memory. In a recording mode, the program code of the application is recorded, including generating an initial address and a data length of a second section of the program code of the application by executing a first section of the program code of the application. According the initial address and the data length of the second section of the program code of the application, the second section of the program code of the application is loaded from the flash memory to the DRAM. A replay file, including the initial address and the data length of the second section of the program code, is generated and stored to the flash memory. In a replay mode, the program code of the application is loaded, including loading the second section of the program code of the application from the flash memory to the DRAM according to the initial address and the data length of the second section of the program code in the replay file.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
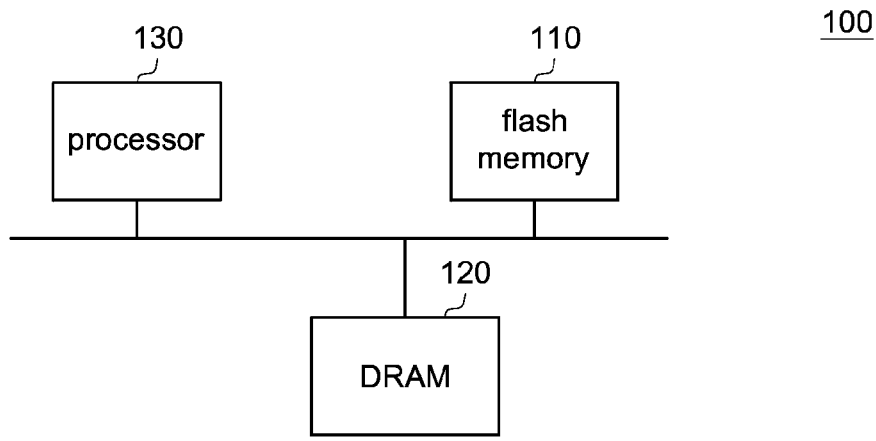
FIG. 1 is a schematic diagram of a computing system according to an embodiment of the present invention.

A computing system capable of accelerating an activation speed of an application by pre-loading a program code of the application is provided according to an embodiment of the present invention. FIG. 1 shows a schematic diagram of a computing system according to an embodiment of the present invention. A computing system 100 includes a flash memory 110, a dynamic random access memory (DRAM) 120 and a processor 130. The flash memory 110 stores program codes of a bootloader, a system kernel and an application. When the computing system 100 is powered on, the processor 130 sequentially loads the program codes of the bootloader and the system kernel from the flash memory 110 to the DRAM 120 to execute the bootloader and the system kernel. The processor 130 then loads the program code of the application from the flash memory 110 to the DRAM 120 to execute the application. For example, the application may be a framework application, e.g., an Android framework application.

Figure 2:
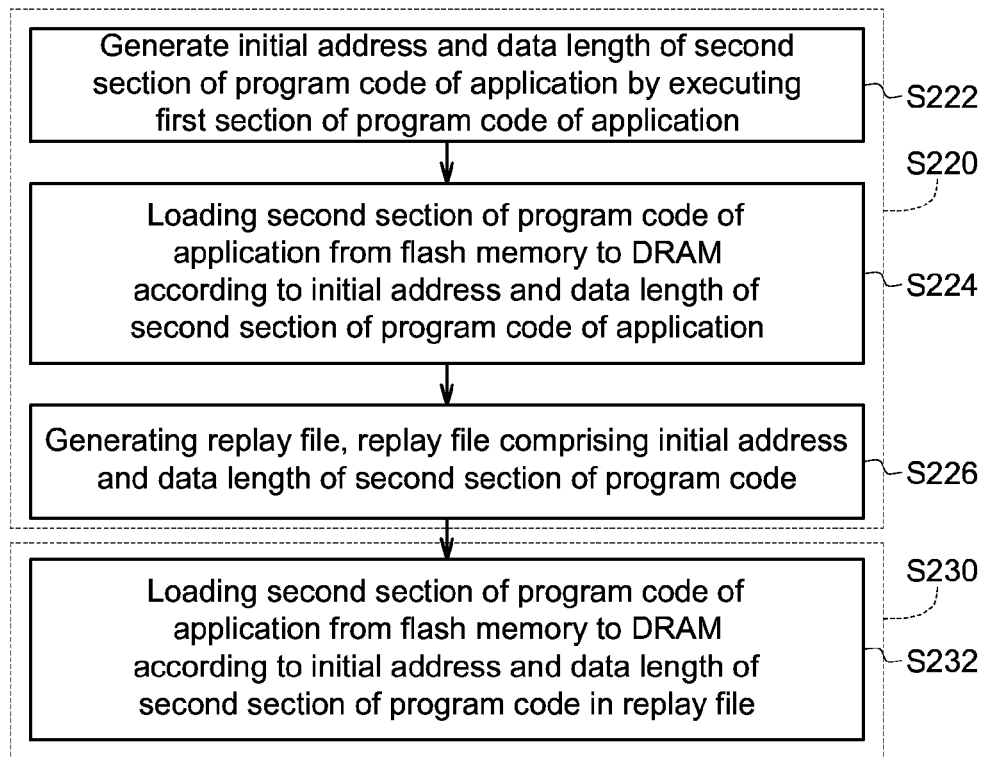
FIG. 2 is a flowchart of a program loading method of an application according to an embodiment of the present invention.

FIG. 2 shows a flowchart of a program code loading method of an application according to an embodiment of the present invention. In the embodiment, in a boot procedure of the computing system 100, in a recording mode, the processor 130 loads a program code of an application to be executed (step S220). Step S220 further includes steps S222 to S226. In a next boot procedure of the computing system 100, the processor 130 switches to a replay mode, and loads the program code of the application to be executed (step S230). Step S230 further includes step S232.

In the recording mode, after completely executing the boot procedure and the system kernel, the processor 130 loads an initial program code PCi of the application to be executed from the flash memory 110 to the DRAM 120 to execute the loaded program code. Before the processor 130 completes executing the initial program code PCi, the processor 130 is unaware of a next section of program code to be executed. Thus, only after completely executing the initial program code PCi, the processor 130 can then load a next program code PC1 to be execute from the flash memory 110 to the DRAM 120 to execute the loaded program code. Similarly, only after completely executing the program code PC1, the processor 130 can then load a next program code PC2 to be executed from the flash memory 110 to the DRAM 120 to execute the loaded program code. For example, after completely executing the program code PCi, the processor 130 generates an initial address AD1 (e.g., 0x2000 0000) and a data length DL1 (e.g., 100 MB) of the program code PC1 (step S222). Next, the processor 130 loads the program code PC1 to be executed from the flash memory 110 to the DRAM 120 according to the initial address AD1 and the data length DL1 of the program code PC1 to execute the loaded program code (step S224). Similarly, after completely executing the program code PC1, the processor 130 generates an initial address AD2 (e.g., 0x5000 0000) and a data length DL2 (e.g., 200 MB) of the next program code PC2 to be executed. Next, the processor 130 loads the program code PC2 from the flash memory 110 to the DRAM 120 according to the initial address AD2 and the data length DL2 of the program code PC2 execute the loaded program code, and so forth. Thus, the processor 130 executes a plurality of sections of program codes PC1-PCn. After generating the initial address AD1 and the data length DL1 of the program code PC1, the processor 130 writes the initial address AD1 and the data length DL1 of the program code PC1 into a replay file (step S226). Similarly, after generating the initial address AD2 and the data length DL2 of the program code PC2, the processor 130 writes the initial address AD2 and the data length DL2 of the program code PC2 into the reply file, and so forth. After the processor 130 executes the program codes PC1 to PCn of the application, the replay file expectedly includes the initial addresses AD1 to ADn and the data lengths DL1 to DLn of the program codes PC1 to PCn. In one embodiment, the numbers of the initial addresses and the data lengths stored in the replay file are constant. That is, instead of storing the initial addresses and data lengths of all sections of the program codes of the applications, the replay file stores the initial addresses AD1 to ADn and the data lengths DL1 to DLn of N sections of program codes (PC1 to PCn) of a plurality of sections of program codes of the application. For example, assume that the replay file stores the initial addresses and data lengths of only 20 sections of program codes of the application. If there are 30 program code sections, the replay file stores only the initial addresses and data lengths of 20 program code sections and does not store the initial address and data lengths of the remaining 10 program code sections. In one embodiment, the processor 130 stores the replay file in the flash memory 110. As data stored in the flash memory 110 is kept intact even after powering off the flash memory 110, the processor 130 is allowed to load the program code of the application according to the replay file stored in the flash memory 110 when the processor 130 is powered on next time.

In the replay mode, after completely executing the boot procedure and the system kernel, the processor 130 loads a section of initial program code PCi of the application to be executed from the flash memory 110 to the DRAM 120 to execute the loaded program code. Different from the recording mode, the processor 130 may pre-load the program code of the application from the flash memory 110 to the DRAM 120 according to the replay file in the flash memory 110 (step S232) for the processor 130 to execute. For example, according to the initial address AD1 and the data length DL1 of the program code PC1 in the replay file, the processor 130 may pre-load the program code PC1 from the flash memory 110 to the DRAM 120; according to the initial address AD2 and the data length DL2 of the program code PC2 in the replay file, the processor 130 may pre-load the program code PC2 from the flash memory 110 to the DRAM 120; and so forth. Thus, according to the initial addresses AD1 to ADn and the data lengths DL1 to DLn of the program codes PC1 to PCn in the replay file, the processor 130 may pre-load the program codes PC1 to PCn from the flash memory 110 to the DRAM 120.

In one embodiment, the processor 130 may be a single-core processor, and loads and executes the program code of the application in parallel in a time-division multiplexed manner. In another embodiment, the processor 130 may be a multi-core processor that processes the task of loading and executing the program code in parallel by different cores. For example, while one core executes the initial program code PCi, another core at the same time pre-loads the program code PC1 from the flash memory 110 to the DRAM 120 according to the initial address AD1 and data length DL1 of the program code PC1 in the replay file.

As such, when the program code to be executed by the processor 130 is pre-loaded into the DRAM 120, the processor 130 may directly execute the program code to be executed according to the program code pre-loaded into the DRAM 120, thereby accelerating the activation speed of the application. For example, when the processor 130 learns that the program code to be executed next has been the program code PC2 after executing the program code PCi, if the program code PC2 is pre-loaded into the DRAM 120, the processor 130 may directly execute the program code PC2 pre-loaded into the DRAM 120, thereby accelerating the activation speed of the application.

Figure 3:
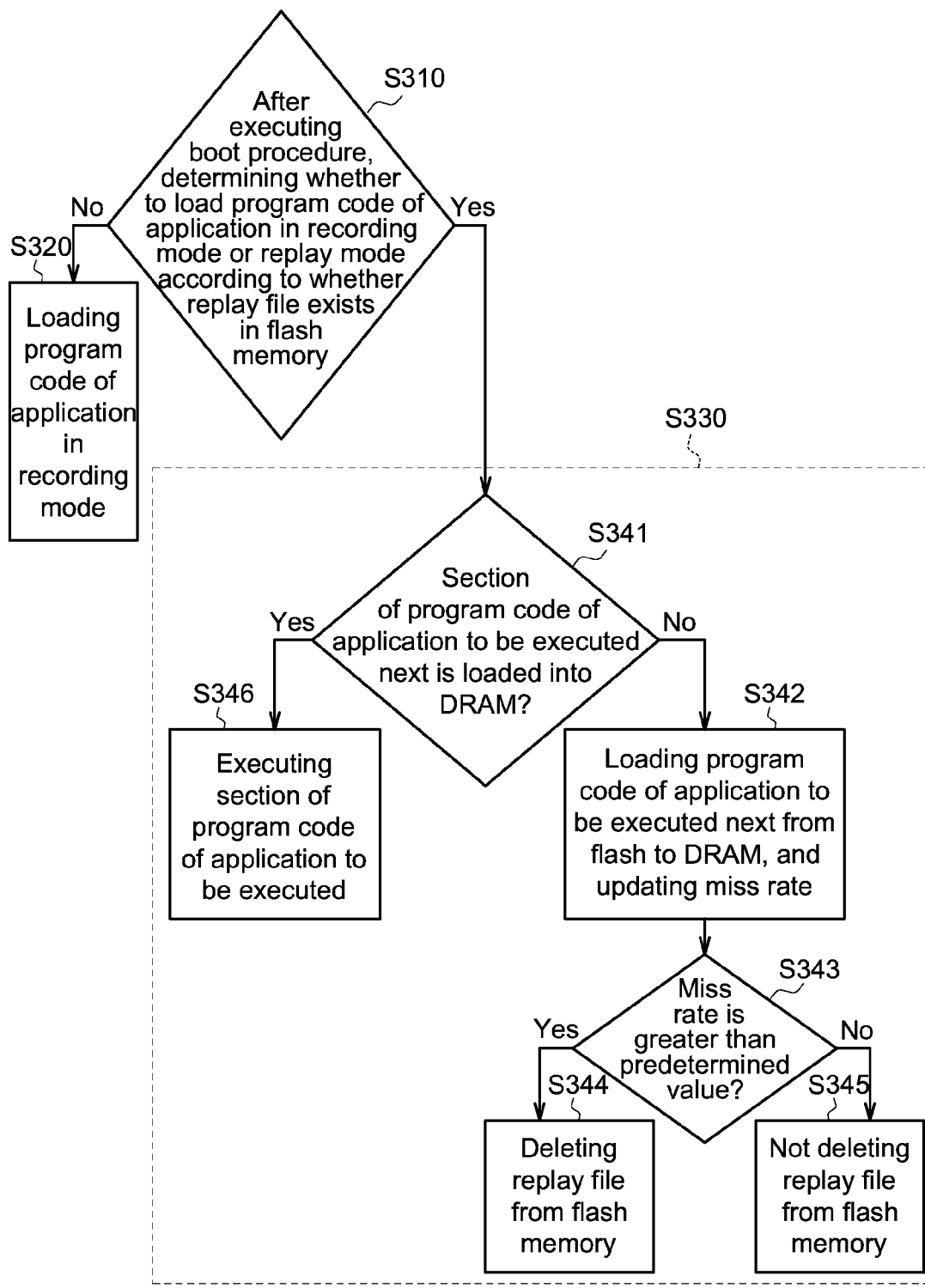
FIG. 3 is a flowchart of a program loading method of an application according to another embodiment of the present invention.

FIG. 3 shows a flowchart of a program code loading method of an application according to another embodiment of the present invention. In the embodiment, after the computing system 100 executes the boot procedure, the processor 130 determines whether to load the program code of the application in the recording mode (S320) or in the replay mode (S330) according to whether the replay file exists in the flash memory 110. Steps S341 to S346 are further included in the replay mode.

After the computing system 100 executes the boot procedure, the processor 130 checks whether the replay file exists in the flash memory 110 (step S310). For example, the replay file is stored at a predetermined position in the flash memory 110. After the computing system 100 executes the boot procedure, the processor 130 checks whether the replay file exists at the predetermined position in the flash memory 110. Step S330 is performed when the replay file exists in the flash memory 110, or else step S320 is performed when the replay file does not exist in the flash memory 110.

In step S320, the processor 130 loads the program code of the application to be executed in the recording mode. Step S320 is similar to step S220, and associated details shall be omitted herein.

In step S330, the processor 130 loads the program code of the application to be executed in the replay mode. Step S330 further includes steps S341 to S346.

After completely executing the program code (e.g., PC1), the processor 130 learns that the next section of program code (e.g., PC2) is to be executed. Next, the processor 130 determines whether the program code PC2 to be executed next has been loaded into the DRAM 120 (step S341).

When the processor 130 determines that the program code PC2 is pre-loaded into the DRAM 120, the processor 130 may directly execute the program code PC2 pre-loaded into the DRAM 120 (step S346).

When the processor 130 determines that the program code PC2 is not pre-loaded into the DRAM 120, the processor 130 loads the program code PC2 to be executed from the flash memory 110 to the DRAM 120, and updates a miss rate (step S342). For example, the miss rate records the number of times that the processor 130 fails to find the program code to be executed from the DRAM 120 in the replay mode. In one embodiment, the processor 130 records the miss rate by a variable number. When the processor 130 fails to find the program code to be executed from the DRAM, the processor 130 updates the miss rate by adding the value of the miss rate by 1.

After updating the miss rate, the processor 130 determines whether the miss rate is greater than a predetermined value (step S343). Step S344 is performed when the miss rate is greater than the predetermined value, or else step S345 is performed when the miss rate is not greater than the predetermined value. The predetermined value may be determined by a designer.

When the processor 130 determines that the miss rate is greater than the predetermined value, the processor 130 deletes the replay file from the flash memory 110 (step S344). For example, a miss rate greater than the predetermined value represents an excessive error in the information recorded in the replay file. Thus, the processor 130 deletes the replay file, and causes the computing system 100 to load the program code of the application according to a common process. That is, instead of determining whether a section of program code to be executed next has been loaded into the DRAM 120 after the processor 130 completes executing one section of program code, the processor 130 loads a section of program code to be executed next from the flash memory 110 to the DRAM 120 only after the processor 130 completes executing a current section of program code.

When the processor 130 determines that the miss rate is not greater than the predetermined value, the processor 130 does not delete the replay file stored from the flash memory 110 (step S345). For example, a miss rate that is not greater than the predetermined value means that the error of the information recorded in the replay file is within a tolerable range. Thus, the processor 130 does not delete the replay file, and continues loading the program code of the application from the flash memory 110 to the DRAM 120 according to the replay file.

Figure 4A:
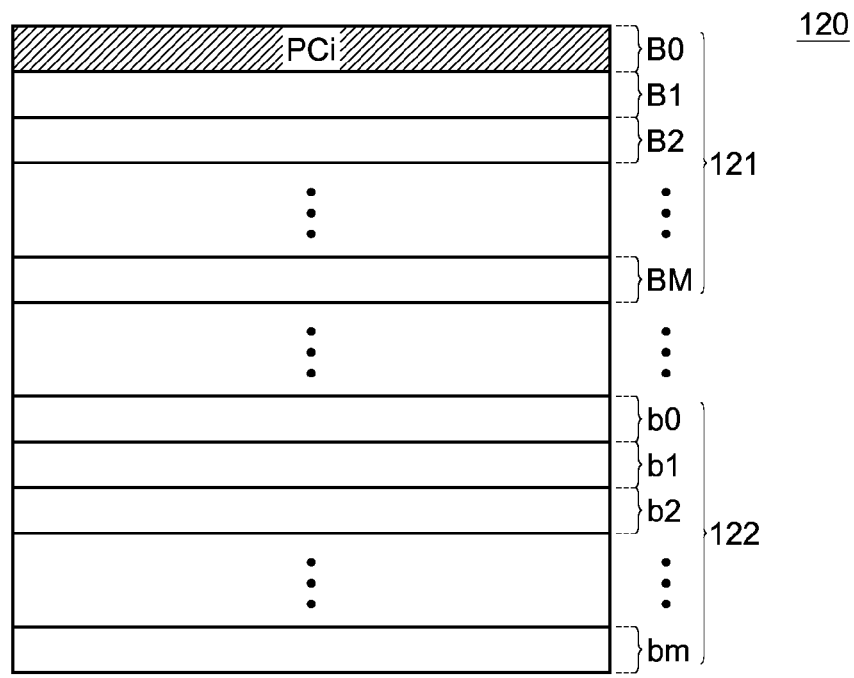
FIG. 4A to FIG. 4C are schematic diagrams of loading a program code of an application to a DRAM in a recording mode.
Figure 4B:
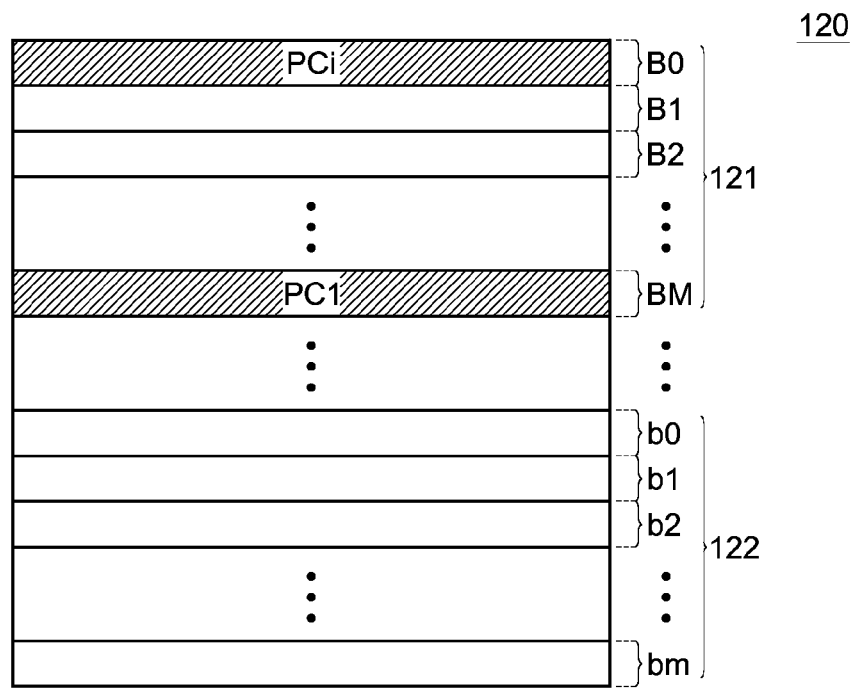
Figure 4C:
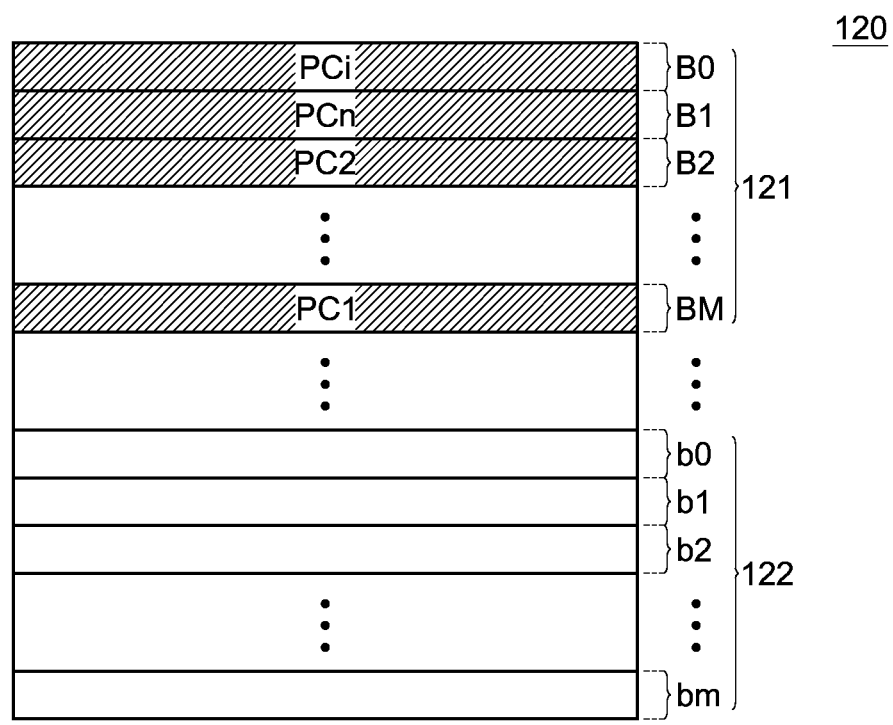

FIG. 4A to FIG. 4C are schematic diagrams of loading a program code of an application to the DRAM 120 in the recording mode according to an embodiment of the present invention. In one embodiment, the DRAM 120 includes a cache address space 122 and an allocated address space 121 of the application. The cache address space 122 is divided into multiple blocks b0 to bm. The allocated address space 121 is divided into multiple blocks B0 to BM. The allocated address space 121 is an address space that the computing system 100 allocates for storing the program code of the application to be executed by the processor 130. The cache address space 122 is an address space that the computing system 100 allocates for storing the program code of the application pre-loaded according to the replay file and to be executed by the processor 130. When the processor 130 is to execute the program code of the application pre-loaded according to the replay file, the processor 130 duplicates the program code to be executed from the cache address space 122 to the allocated address space 121 of the application.

Referring to FIG. 4A to FIG. 4C, in the embodiment, after the processor 130 completes executing the boot procedure and the system kernel, the initial program code PCi of the application is loaded from the flash memory 110 to the allocated address space 121 of the DRAM 120. For example, as shown in FIG. 4A, the initial program code PCi is loaded to the block B0. Next, after the processor 130 completes executing the program code PCi, the program code PC1 of the application to be executed next has been loaded from the flash memory 110 to the allocated address space 121 of the DRAM 120. It should be noted that, each time the processor 130 completes executing the initial program code PCi, the program code PC1 of the application to be executed next is not necessarily the same section of the program code. That is to say, after the processor 130 completes executing the initial program code PCi, the program code of the application to be executed next may be the first section of the program code of the application or may be the second section of the program code of the application. Therefore, the program code PC1 in the embodiment refers to the program code section to be executed after completely executing the initial program code PCi. For example, as shown in FIG. 4B, assuming that the program code PC1 of the application to be executed is the $M^{th}$ section of program code of the application after the processor completes executing the initial program code PCi, the program code PC1 is loaded into the block BM, and so forth. Thus, in the recording mode, the program codes PC1 to PCn of the application are loaded from the flash memory 110 to the allocated address space 121 of the DRAM 120. For example, as shown in FIG. 4C (not entirely shown), assuming that the program code PC2 of the application to be executed next is the $2^{nd}$ section of program code of the application after the processor 130 completes executing the program code PC1, the program code PC2 is loaded into the block B2; assuming that the program code PCn to be executed next after the processor 130 completes executing the program code PCn−1 is the $1^{st}$ section of program code of the application, the program code PCn is loaded into the block B1. That is, in the embodiment, the initial code PCi is loaded into the block B0, and the program codes PC1 to PCn are loaded into the corresponding blocks in the allocated address space according to the program code section sequence of the application. For example, if the program code PC1 is the $2^{nd}$ section of the program code of the application, the program code PC1 is loaded to the block B2; if the program code PC2 is the $1^{st}$ section of the program code of the application, the program code PC2 is loaded into the block B1, and is not limited to the circumstances shown in FIG. 4A to FIG. 4C.

Figure 5A:
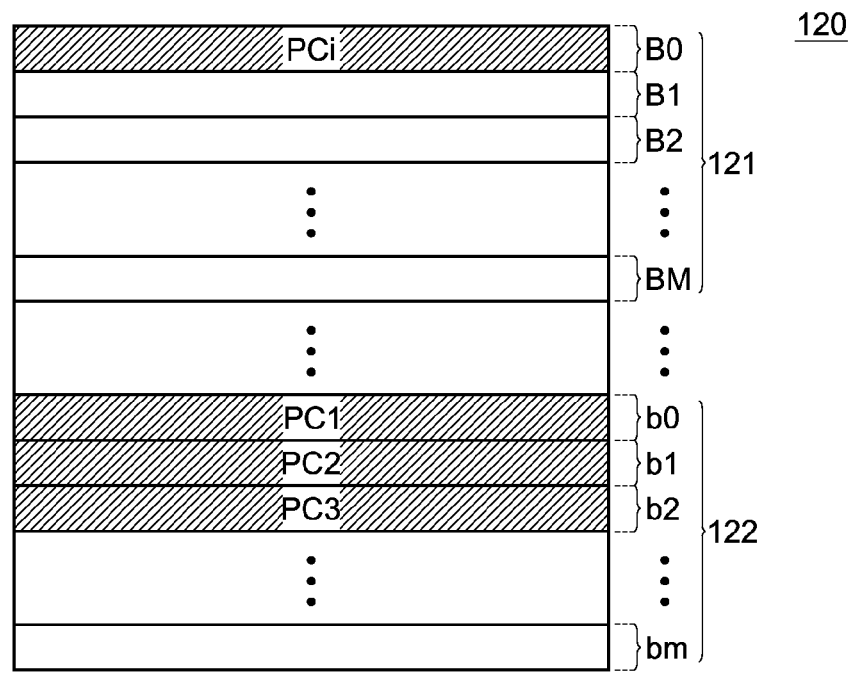
FIG. 5A to FIG. 5C are schematic diagram of loading a program code of an application to a DRAM in a replay mode.
Figure 5B:
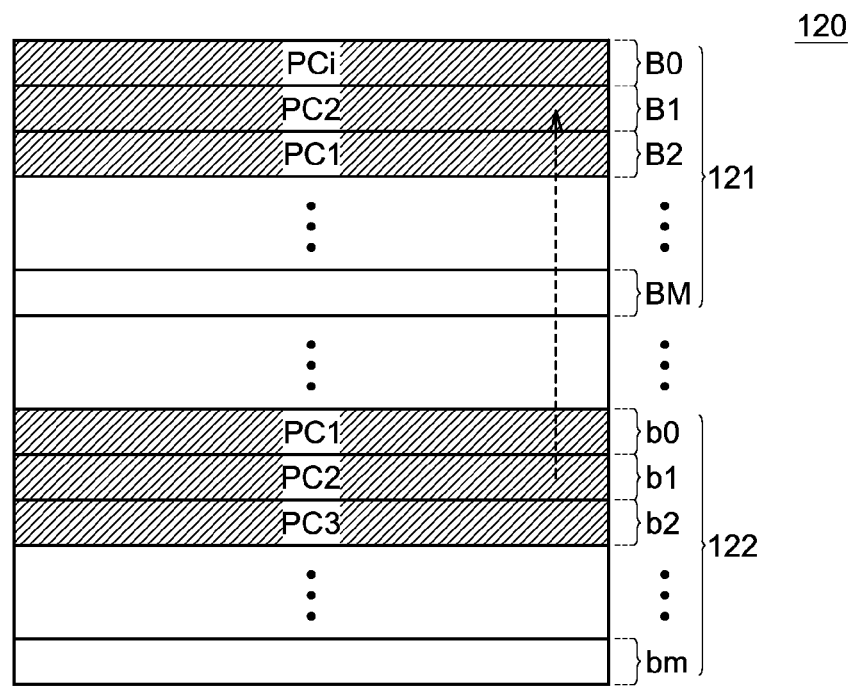
Figure 5C:
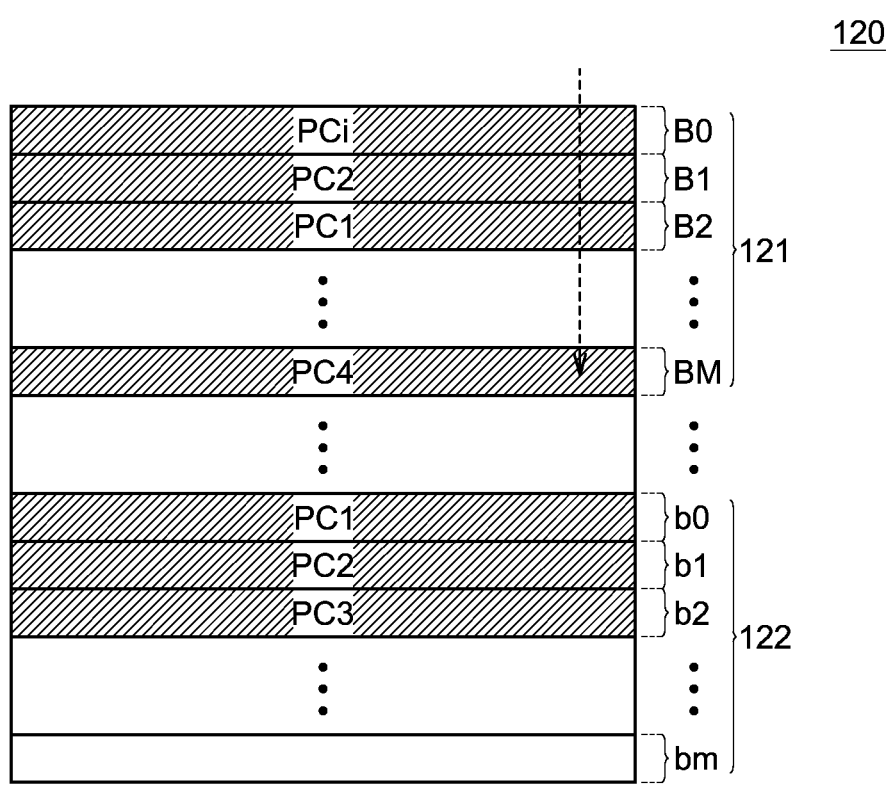

FIG. 5A to FIG. 5C show schematic diagrams of loading a program code of an application to the DRAM 120 in the replay mode according to an embodiment of the present invention. In the embodiment, after the processor 130 completes executing the boot procedure and the system kernel, the initial program code PCi of the application is loaded from the flash memory 110 to the allocated address space 121 of the DRAM 120 for the processor 130 to execute. The program codes PC1 to PCn corresponding to the replay file are sequentially loaded from the flash memory 110 to the cache address space 122 of the DRAM 120, as shown in FIG. 5A. For example, the initial program code PCi is loaded into the block B0 of the allocated address space 121, the program code PC1 is loaded to the block b0 of the cache address space 122, the program code PC2 is loaded to the block b1 of the cache address space 122, and the program code PC3 is loaded to the block b2 of the cache address space 122. In FIG. 5A, the program codes PC1 to PC3 are loaded into the cache address 122 of the DRAM 120, and the program codes PC4 to PCn are not yet loaded into the cache address space 122 of the DRAM 120.

Next, after the processor 130 completes executing the initial program code PCi and generates the program code to be executed next, the processor 130 determines whether the program code to be executed next has been loaded into the cache address space 122 of the DRAM 120. After it is determined that the program code to be executed next has been loaded into the cache address space 122 of the DRAM 120, the processor 130 duplicates the program code to be executed next from the cache address space 122 of the DRAM 120 to the allocated address space 121 of the application in the DRAM 120 to execute the duplicated program code. After it is determined that the program code to be executed next has not been loaded into the cache address space 122 of the DRAM 120, the processor 110 loads the program code to be executed next from the flash memory 110 to the allocated address space 121 of the application in the DRAM 120 to execute the loaded program code.

For example, after determining whether the program code to be executed next has been loaded into the cache address space 122 of the DRAM 120, in a situation where the program codes PC1 to PC3 of the application are already loaded into the cache address space of the DRAM 120, and the program codes PC4 to PCn of the application are not yet loaded into the cache address space 122 of the DRAM 1200, if the program code to be executed next is the program code PC2, the processor 130 duplicates the program code PC2 from the cache address space 122 of the DRAM 120 to the allocated address space 121 of the application in the DRAM 120 to execute the duplicated program code, as shown in FIG. 5B. In FIG. 5B, a dotted arrow represents that the program code PC2 is duplicated from the block b1 of the cache address space 122 to the block B1 of the allocated address space 121. If the program code to be executed next is PC4, the processor 130 loads the program code PC4 from the flash memory 110 to the allocated address space 121 of the application in the DRAM 120 to execute the loaded program code, as shown in FIG. 5C. In FIG. 5C, a dotted arrow represents that the program code PC4 is loaded from the flash memory 110 to the block BM of the allocated address space 121.

According to the above embodiments of the present invention, an application may be activated in two modes. In the recording mode, an initial address and a data length of a section of program code of an application are recorded in a replay file. In a replay mode, while the processor is executing the section of program code of the application stored in a DRAM, according to the initial address and the data length recorded in the replay file, the processor may pre-load a section of program code of the application not yet stored to the DRAM or a section of program code of the application to be subsequently used from the flash memory to the DRAM. Thus, the flash memory is not required to wait to access a section of program code of the application to be executed next only when the processor learns the section of program code of the application to be executed next, thereby accelerating the activation speed of the application.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computing system that pre-loads a program code of an application, comprising:
   a flash memory, storing the program code of the application;
   a dynamic random access memory (DRAM); and
   a processor, performing a following method:
      in a recording mode, loading the program code of the application, comprising:
         generating an initial address and a data length of a second section of the program code by executing a first section of the program code of the application;
         loading the second section of the program code of the application from the flash memory to the DRAM according to the initial address and the data length of the second section of the program code of the application; and
         generating a replay file, the replay file comprising the initial address and the data length of the second section of the program code, and storing the replay file to the flash memory; and
      in a replay mode, loading the program code of the application, comprising:
         loading the second section of the program code of the application from the flash memory to the DRAM according to the initial address and the data length of the second section of the program code in the replay file.

2. The computing system according to claim 1, wherein:
   the DRAM further comprises a cache address space and an allocated address space of the application, and the cache address space is different from the allocated address space;
   in the recording mode, the second section of the program code is loaded into the allocated address space of the application; and
   in the replay mode, the second section of the program code is loaded into the cache address space according to the replay file.

3. The computing system according to claim 2, wherein the method performed by the processor further comprises:
   in the replay mode, the step of loading the program code of the application further comprises:
      determining whether a section of the program code of the application to be executed next has been loaded into the DRAM; and
      after it is determined that the section of the program code to be executed next has been loaded into the DRAM, duplicating the section of the program code of the application to be executed next from the cache address space to the allocated address space of the application.

4. The computing system according to claim 2, wherein the method performed by the processor further comprises:
   in the replay mode, the step of loading the program code of the application further comprises:

determining whether a section of the program code of the application to be executed next has been loaded into the DRAM; and after it is determined that the section of the program code to be executed next has not been loaded into the DRAM, loading the section of the program code of the application to be executed next from the flash memory to the allocated address space of the application.

5. The computing system according to claim 1, wherein the method performed by the processor further comprises:

in the replay mode, the step of loading the program code of the application further comprises:

determining whether a section of the program code of the application to be executed next has been loaded into the DRAM;

after it is determined that the section of the program code of the application to be executed next has not been loaded into the DRAM, updating a miss rate;

determining whether the miss rate is greater than a predetermined value; and after it is determined that the miss rate is greater than the predetermined value, deleting the replay file from the flash memory.

6. The computing system according to claim 5, wherein the method performed by the processor further comprises:

after executing a boot procedure, determining to load the program code of the application either in the recording mode or in the replay mode according to whether the replay file exists in the flash memory.

7. The computing system according to claim 6, wherein the application is a framework application.

8. A method that pre-loads a program code of an application, applied to a computing system that stores the program code of the application to a flash memory, the method comprising:

in a recording mode, loading the program code of the application, comprising:

generating an initial address and a data length of a second section of the program code by executing a first section of the program code of the application;

loading the second section of the program code of the application from the flash memory to the DRAM according to the initial address and the data length of the second section of the program code of the application; and generating a replay file, the replay file comprising the initial address and the data length of the second section of the program code, and storing the replay file to the flash memory; and in a replay mode, loading the program code of the application, comprising:

loading the second section of the program code of the application from the flash memory to the DRAM according to the initial address and the data length of the second section of the program code in the replay file.

9. The method according to claim 8, wherein:

in the recording mode, the second section of the program code is loaded into an allocated address space of the application in the DRAM; and in the replay mode, the second section of the program code is loaded into a cache address space in the DRAM; the cache address space is different from the allocated address space.

10. The method according to claim 9, wherein the step of loading the program code of the application in the replay mode further comprises:

determining whether a section of the program code of the application to be executed next has been loaded into the DRAM; and after it is determined that the section of the program code to be executed next has been loaded into the DRAM, duplicating the section of the program code of the application to be executed next from the cache address space to the allocated address space of the application.

11. The method according to claim 9, wherein the step of loading the program code of the application in the replay mode further comprises:

determining whether a section of the program code of the application to be executed next has been loaded into the DRAM; and after it is determined that the section of the program code to be executed next has not been loaded into the DRAM, loading the section of the program code of the application to be executed next from the flash memory to the allocated address space of the application.

12. The method according to claim 8, wherein the step of loading the program code of the application in the replay mode further comprises:

determining whether a section of the program code of the application to be executed next has been loaded into the DRAM;

after it is determined that the section of the program code of the application to be executed next has not been loaded into the DRAM, updating a miss rate;

determining whether the miss rate is greater than a predetermined value; and when it is determined that the miss rate is greater than the predetermined value, deleting the replay file from the flash memory.

13. The method according to claim 12, further comprising:

after executing a boot procedure, determining to load the program code of the application either in the recording mode or in the replay mode according to whether the replay file exists in the flash memory.

14. The method according to claim 13, wherein the application is a framework application.

* * * * *